United States Patent
Han

(10) Patent No.: US 8,203,578 B2
(45) Date of Patent: Jun. 19, 2012

(54) MAP SCROLL METHOD AND APPARATUS FOR CONDUCTING SMOOTH MAP SCROLL OPERATION FOR NAVIGATION SYSTEM

(75) Inventor: Maung Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1246 days.

(21) Appl. No.: 11/980,234

(22) Filed: Oct. 30, 2007

(65) Prior Publication Data
US 2009/0109245 A1    Apr. 30, 2009

(51) Int. Cl.
*G09G 5/00* (2006.01)
*G08G 1/123* (2006.01)
*G01C 21/00* (2006.01)

(52) U.S. Cl. ........ 345/684; 345/687; 345/688; 345/629; 345/643; 340/995.1; 701/201; 701/208

(58) Field of Classification Search .................... 345/687
See application file for complete search history.

(56) References Cited

U.S. PATENT DOCUMENTS

| | | | | |
|---|---|---|---|---|
| 6,330,858 | B1 * | 12/2001 | McDonough et al. | 101/208 |
| 6,771,280 | B2 * | 8/2004 | Fujisaki et al. | 345/684 |
| 2006/0173336 | A1 * | 8/2006 | Goubergen | 600/450 |
| 2006/0287819 | A1 * | 12/2006 | Brulle-Drews et al. | 701/211 |

FOREIGN PATENT DOCUMENTS
JP      2005-100286      4/2005
* cited by examiner

*Primary Examiner* — Xiao M. Wu
*Assistant Examiner* — Tize Ma
(74) *Attorney, Agent, or Firm* — Muramatsu & Associates

(57) ABSTRACT

A display method and apparatus for a navigation system utilizes enables a smooth map scroll operation when a scroll direction is changed sharply. Such a smooth map scroll operation is applied to a situation where such a change of scroll direction is within a predetermined angle range by adding a scroll direction bias for each movement. The display method dynamically adjusts the scroll direction bias and the update frequency depending on the degree of direction change and the available system resources such as a processing speed in the navigation system. Therefore, the navigation system is able to display the smooth operation of the map scroll so that the user is able to recognize the images actually illustrated on the screen and to reach the intended location of the map image quickly and accurately.

14 Claims, 8 Drawing Sheets

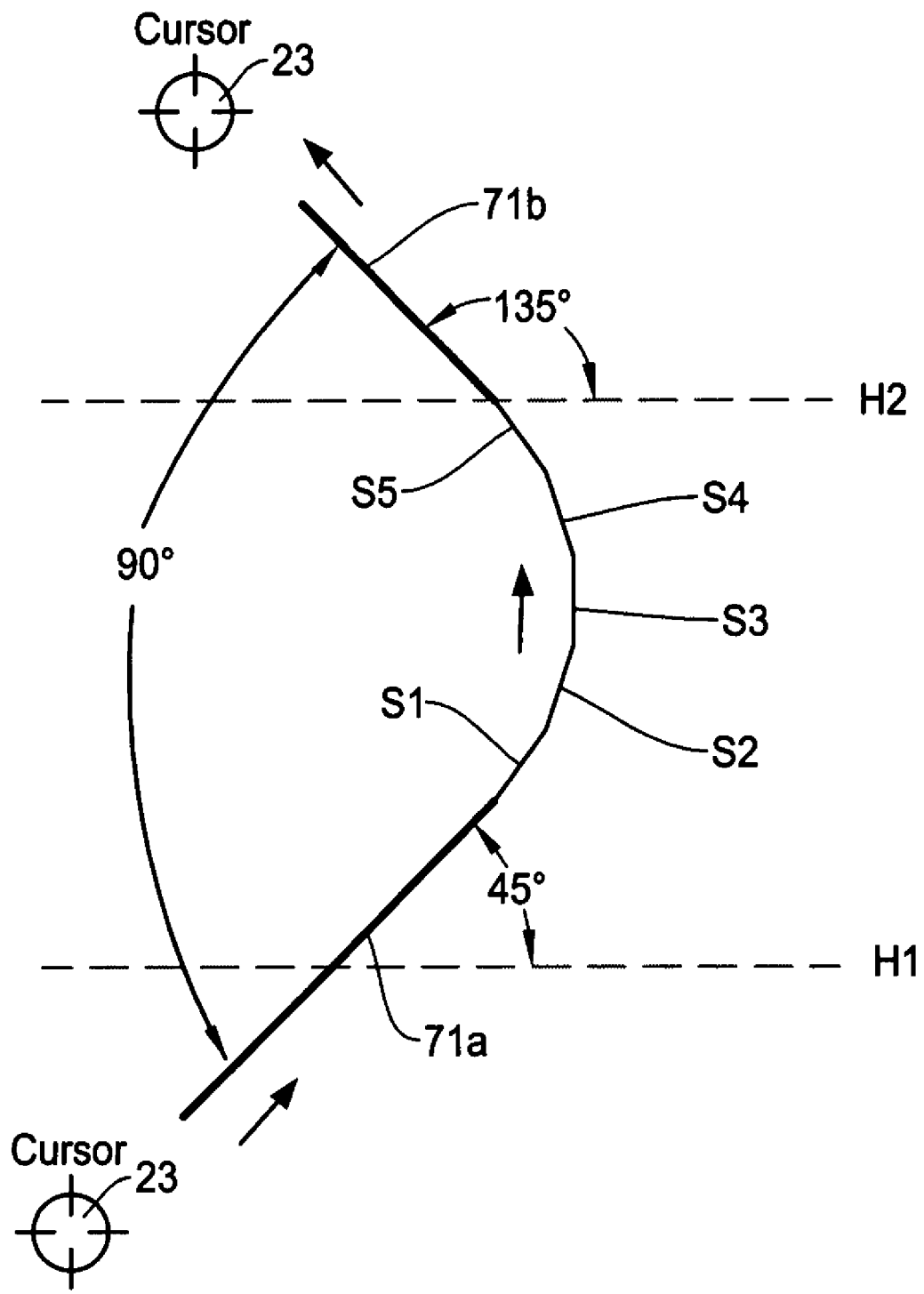

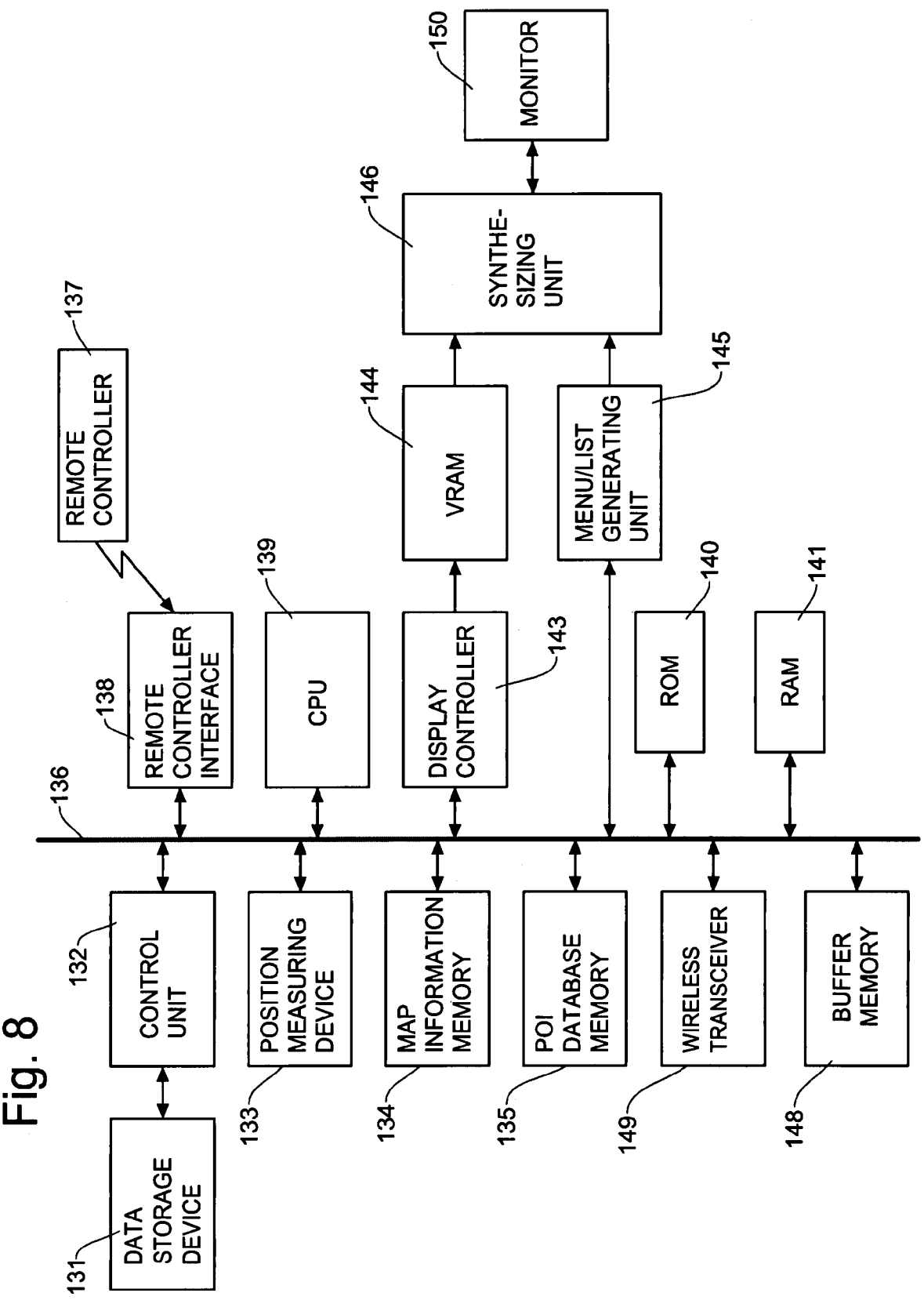

MAP SCROLL METHOD AND APPARATUS FOR CONDUCTING SMOOTH MAP SCROLL OPERATION FOR NAVIGATION SYSTEM

FIELD OF THE INVENTION

This invention relates generally to a method and apparatus for a navigation system, and more particularly, to a map scroll method and apparatus for conducting a smooth map scroll operation for a navigation system by applying a scroll direction bias to smoothly change the moving directions involved in the map scroll operation.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

When a destination is specified by a user, the navigation system determines a route to the destination based on, for example, the shortest way to reach the destination, the route using many free ways as possible or the route without using toll road, and the like. After determining the calculated route, the navigation system starts the route guidance operation to guide the user along the calculated route to the destination. Typically, the navigation system shows the intersection to show the next turn and a direction of the turn. Such route guidance by the navigation system is also accompanied by voice instructions.

The navigation system displays a map image on a monitor screen on which various map elements such as streets including the calculated route to the destination, fields, rivers, mountains, buildings, etc., are illustrated. The user is able to scroll the illustrated image on the screen to change the map image to that of the desired location. The user can scroll the map image by placing a finger on the display screen and dragging a cursor on the screen or by operating a scroll key on a front panel or remote controller, etc. The scroll key may be configured by, for example, eight directional arrow keys, etc.

FIGS. 1A-1C are schematic diagrams showing display examples on the screen of a navigation system where the map image is being scrolled by moving a cursor 23 on the screen. Specifically, in FIG. 1A, the map image is scrolled by moving the cursor 23 to the right as shown by an arrow 25, which results in the map image shown in FIG. 1B. The map image of FIG. 1B is further scrolled by moving the cursor 23 to the upper left direction shown by an arrow 27, which results in the map image shown in FIG. 1C.

The schematic view of FIG. 2 shows a scroll direction involved in the above example of the map scroll operation shown FIGS. 1A-1C. In the scroll direction of FIG. 2, the first scroll path 51 (from point A to point B) is directed toward the right and the second scroll path 53 (point B to point C) is directed toward the upper left. Namely, the scroll direction is changed sharply between the first path 51 and the second path 53. Such a sharp change of the map scroll direction may confuse and/or dazzle the user watching the screen especially when the scroll speed is high because it is difficult to follow the abrupt change of the map image on the screen.

Namely, there is a drawback that the change of the map image is too abrupt as shown in FIG. 2 during the transition between the first scroll path 51 and the second scroll path 53. When the user changes the direction of the map scroll to another and the speed of the scroll operation is high, it may be difficult for the user to recognize what is actually illustrated on the screen is the one that the user wants. Moreover, the user may repeatedly overshoot the location on the screen in such a situation until reaching the actually desired location because it is difficult to accurately control the location on the map image. Thus, there is a need of a map scroll method and apparatus that overcomes the shortcomings described above.

SUMMARY OF THE INVENTION

It is, therefore, an object of the present invention to provide a map scroll method and apparatus for a navigation system to smoothly scroll a map image by incorporating an appropriate degree of curvature when the map scroll direction is changed abruptly.

It is another object of the present invention to provide a map scroll method and apparatus for a navigation system to dynamically adjust a map scroll angle by adding a scroll direction bias when there is a sharp change in the map scroll direction.

It is a further object of the present invention to provide a map scroll method and apparatus for a navigation system which is able to determine whether the smooth map scroll operation should be applied based on the degree of change in the scroll direction and the current situation associated with the navigation system.

It is a further object of the present invention to provide a map scroll method and apparatus for a navigation system which allows the user to recognize the images actually illustrated on the screen and to reach the intended location of the map image quickly and accurately even when the map scroll direction is changed abruptly.

One aspect of the present invention is a map scroll method for a navigation system. The method includes the steps of: receiving a scroll signal from an input device operated by a user for scrolling a map image on a monitor screen of the navigation system; checking a current condition for applying a smooth scroll operation; and conducting the smooth scroll operation in response to the scroll signal while adjusting a scroll angle of the map image on the monitor screen based on the current condition. The current condition includes an angle of scroll direction change where the smooth scroll operation is conducted when the angle of scroll direction change is within a predetermined range.

In the map scroll method, the step of checking the current condition includes a step of checking a computing power of the navigation system currently available for the scroll operation. In the map scroll method, the step of conducting the smooth scroll operation includes a step of determining an amount of scroll direction bias which is an angle to be added in a step by step manner to a previously specified scroll direction when the angle of scroll direction change is within the predetermined range.

Further, in the map scroll method of the present invention, the step of conducting the smooth scroll operation further includes a step of determining an amount of update frequency which is a number of times that the scroll direction is updated or modified by adding the scroll direction bias. In the map scroll method, the step of conducting the smooth scroll operation further includes a step of determining an amount of time needed for completing the direction change of the scroll operation.

In the map scroll method of the present invention, the step of conducting the smooth scroll operation further includes a step of adding the amount of the scroll direction bias to the previously specified scroll direction by the number of times defined by the update frequency. Further, in the map scroll method, the step of checking the current condition includes a step of determining an amount of total direction difference which is an amount of angle between a previously specified scroll direction and a currently specified scroll direction.

In the map scroll method of the present invention, the step of determining the amount of scroll direction bias is conducted by dividing the total direction difference by the update frequency. Further, the step of checking the current condition includes a step of checking a location of the user as to whether the user is approaching a next intersection that requiring a maneuvering action so as not to adversely affect a route guidance operation of the navigation system and safe driving. The map scroll method further includes a step of correcting an error associated with calculated positions of the map image relative to actual pixel positions on the monitor screen.

Another aspect of the present invention is a map scroll apparatus for a navigation system for implementing the steps defined in the map scroll methods of the present invention noted above. The apparatus includes various means to adjust the scroll angle by adding the scroll direction bias when scrolling the map image on the monitor screen. The map scroll apparatus dynamically adjusts the scroll direction angle and the update frequency by checking the degree of the total direction difference, available resources such as a computational power of the navigation system, etc.

According to the present invention, when the user operates scroll keys, the navigation system scrolls a map image on the monitor screen with a modified angle when the user sharply changes the scroll direction. Such a scroll smoothing operation is applied to a situation where such a change of scroll direction is within a predetermined angle range by adding a scroll direction bias for each update frequency. The navigation system dynamically adjusts the scroll direction bias and the update frequency depending on the degree of direction change and the available system resources such as processing speed in the navigation system. Therefore, the navigation system is able to keep displaying the smooth operation of the map scroll on the monitor screen even when the user sharply changes the scrolling direction so that the user is able to recognize the images actually illustrated on the screen and to reach the intended location of the map image quickly and accurately.

BRIEF DESCRIPTION OF THE DRAWINGS

FIG. 3A shows eight scroll directions involved in a typical navigation system, FIG. 3B shows an example of map scroll paths when the scroll direction bias of the present invention is not applied, and FIG. 3C shows an example of map scroll paths when the scroll direction bias of the present invention is applied.

FIG. 4 is a schematic diagram showing an enlarged view of the map scroll path to explain the application of the scroll direction bias to smoothly change the map scroll direction under the present invention.

FIG. 8 is a block diagram showing an example of configuration of a vehicle navigation system implementing the map scroll method of the present invention.

DETAILED DESCRIPTION OF THE PREFERRED EMBODIMENT

The method and apparatus for smooth map scroll operation under the present invention is described with reference to the accompanied drawings. In the following, the description will be made mainly for the case where the map scrolling method and apparatus is applied to a vehicle navigation system. However, the map scrolling method and apparatus under the present invention can be implemented to other devices having a function of displaying and scrolling map images, such as portable navigators, PDAs, cellular phones, personal computers, etc.

The method and apparatus of the present invention provides a more smooth way of scrolling map images on the monitor screen of the navigation system especially when there is a sharp change in the scroll directions. The scrolling method and apparatus of the present invention dynamically adjusts a scroll direction to provide a smooth and efficient scrolling operation for the desired map image while achieving intuitive operability. Basically, the scroll directions are adjusted by applying a scroll direction bias to incrementally change the scroll direction to the final direction, thereby improving the smoothness and operability in changing the scroll directions.

Figure 1A:
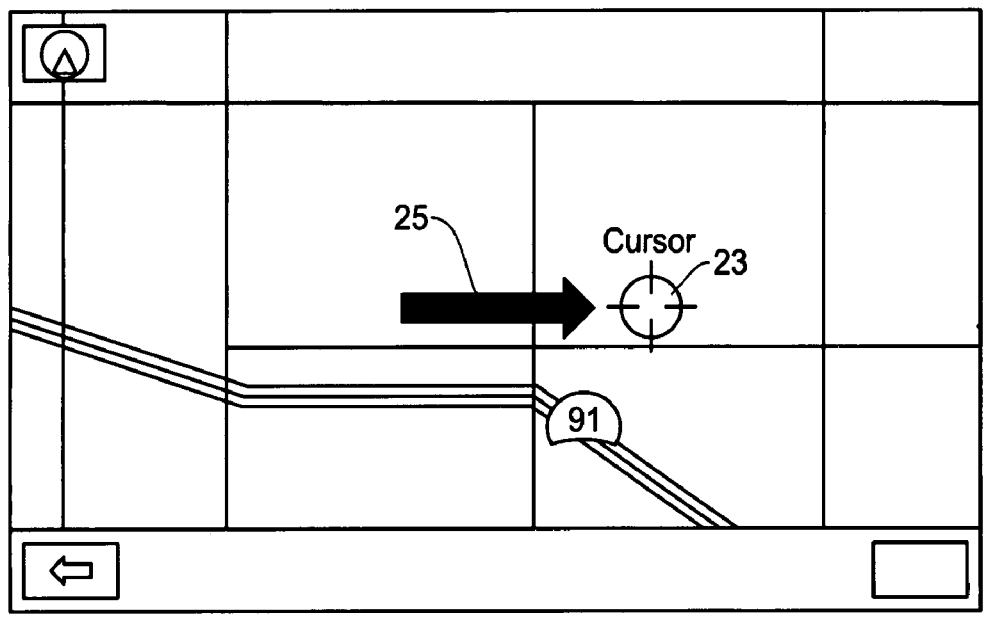
FIGS. 1A-1C are schematic diagrams showing display examples on the screen of a navigation system where the map image is being scrolled in the directions indicated by arrows where there is a sharp change in the scroll direction between FIG. 1A and FIG. 1B.
Figure 1B:
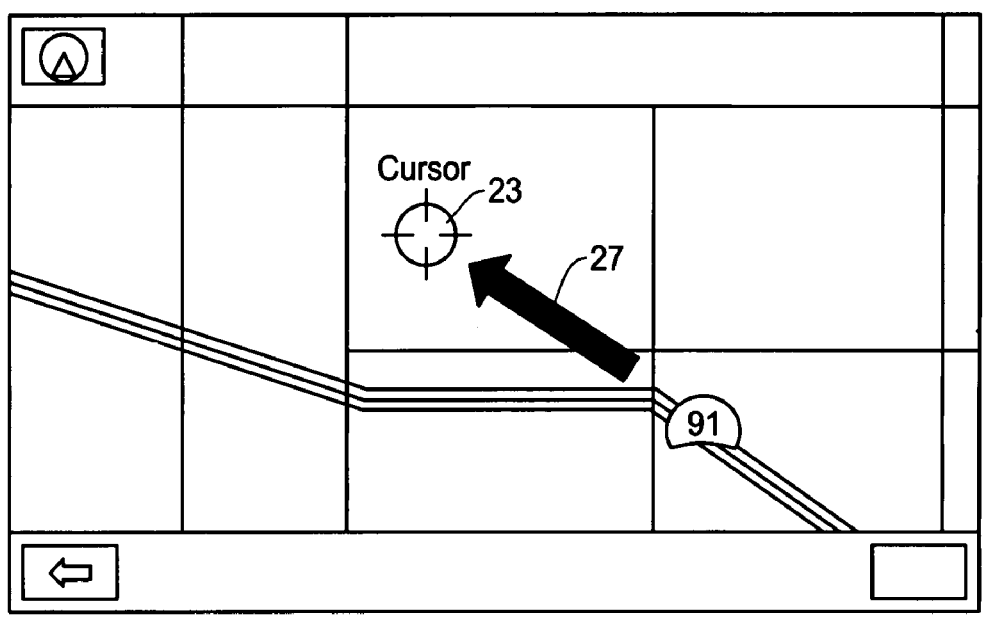
Figure 1C:
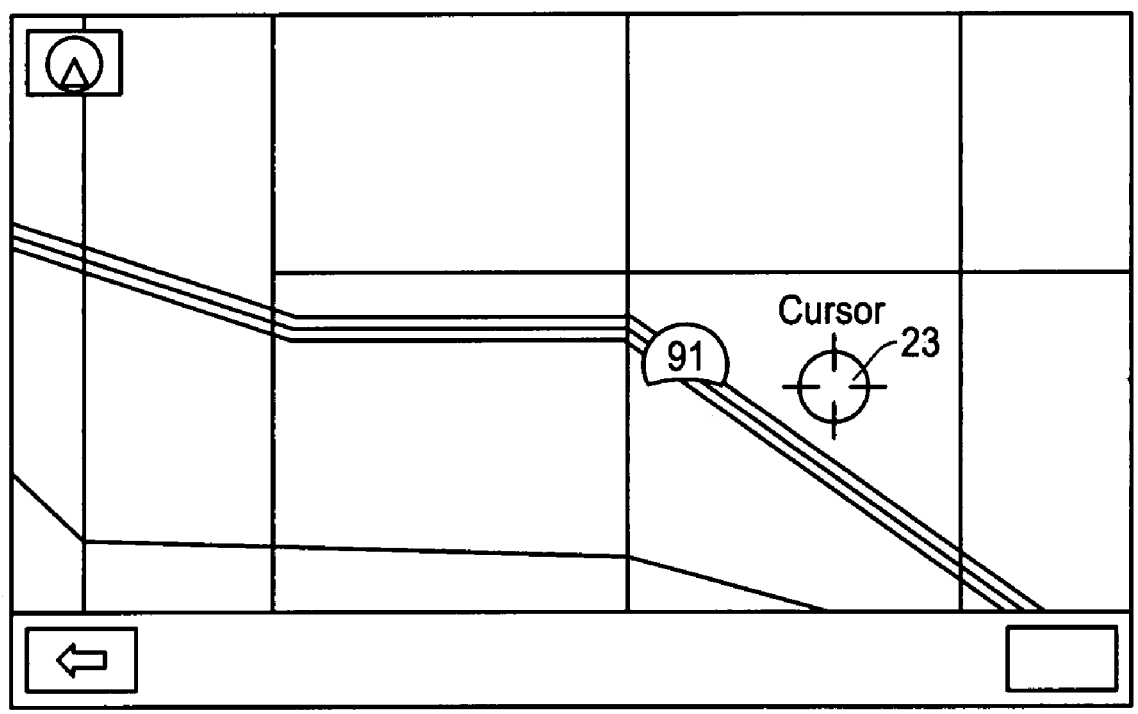
Figure 2:
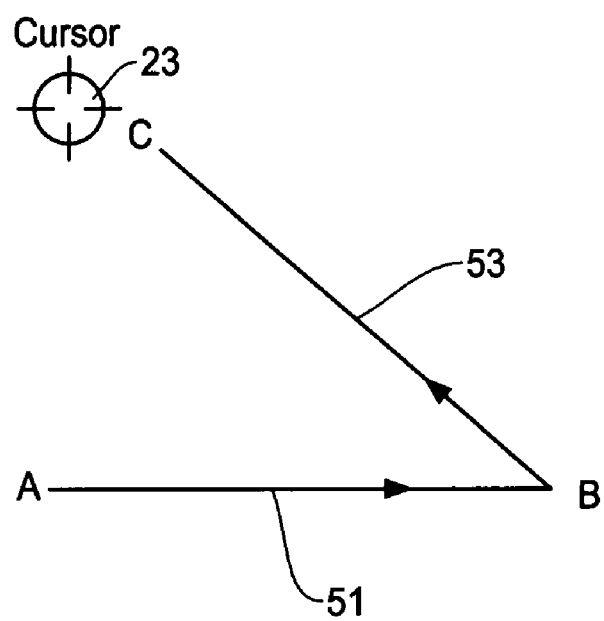
FIG. 2 is a schematic diagram showing scroll paths and directions involved in the example of the map scroll operation shown in FIGS. 1A-1C.
Figure 3A:
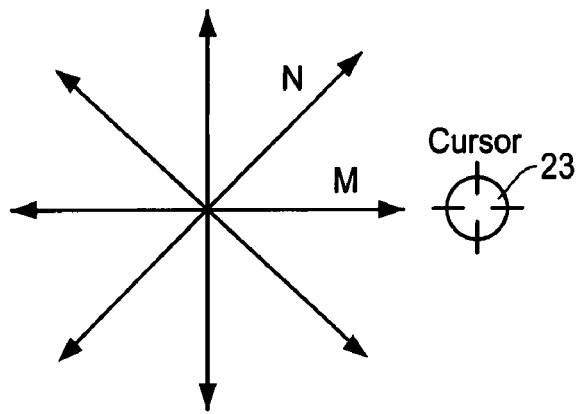
FIGS. 3A-3C are schematic diagrams showing an example of operation of the map scroll method and apparatus of the present invention where
Figure 3B:
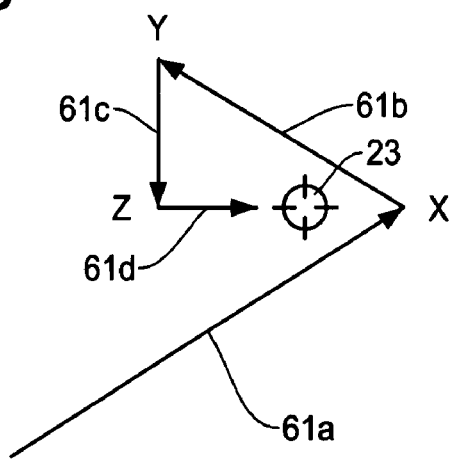
Figure 3C:
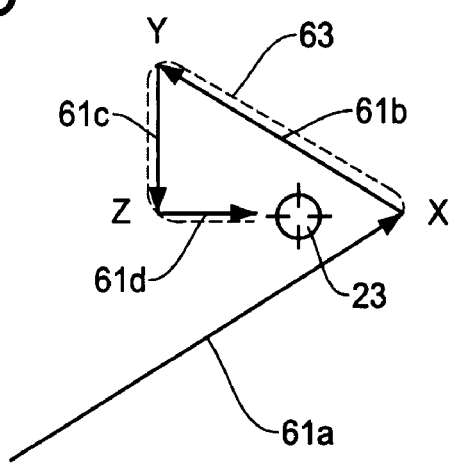

FIGS. 3A to 3C are schematic diagrams showing a basic principle and effect of map scroll operation involving the scroll direction bias of the present invention. FIG. 3A shows an example of eight scroll directions involved in a scroll key of a typical navigation system to scroll the map image by moving the cursor 23 in such directions. FIG. 3B shows the map scroll path in the situation when the scroll direction bias of the present invention is not applied to the map scroll operation. FIG. 3C shows the map scroll path in the situation when the scroll direction bias of the present invention is applied to the map scroll operation, thereby gradually and smoothly changing the scroll direction to the final direction.

Because the typical navigation system has eight or otherwise limited number of direction keys for specifying the map scroll direction as shown in FIG. 3A, the map scroll operation usually includes a sharp change in the scroll direction. Thus, as in the example of FIGS. 3B and 3C, the scroll paths indicated by solid lines 61a, 61b, 61c and 61d are zigzagged with sharp (small) angles. For example, at points X, Y and Z of the scroll paths shown in FIGS. 3B and 3C, there arises sharp changes in the map scroll directions.

When there are such sharp changes of the map scroll direction, the navigation system cannot follow such abrupt changes because of the limited resources (computer power, etc.), thus, may show inaccurate images. Even though the navigation system is able to display such abrupt changes of the map images on the screen, the user may be confused, dizzied or dazzled by such abrupt changes. This is because it is difficult for the user to accurately recognize what is actually illustrated on the monitor screen during such a short period of time.

FIG. 3C shows the scroll paths wherein the method and apparatus for smoothing the map scroll operation under the present invention is applied. The dotted path 63 is a smoothed scroll path that is obtained as a result of the smooth map scroll method incorporating the scroll direction bias. As shown, the scroll path around the area where the scroll direction has sharply changed is denoted by curved lines so that it becomes smoother compared to that shown in FIG. 3B. Due to the smoothed scroll direction change, the visually unpleasant scroll and maneuvering difficulty of the map image caused by the sharp changes or zigzagged scrolling direction can be prevented or mitigated.

As noted above, in the present invention, the scroll direction (movement of the cursor 23) is calculated and modified by applying the scrolling direction bias. In other words, even if the user changes the scroll direction sharply, because the scroll key can specify only, for example, eight directions as in the example of FIG. 3A, the navigation system modifies such abrupt changes and gradually changes the scroll direction to the specified direction. Within the context of the present invention, the scroll direction bias is an amount of degree to change the scroll direction for each cursor movement or each step predefined by the method of the present invention.

With reference to the schematic diagram of FIG. 4, the scrolling direction bias of the present invention is described in detail for the case when the user sharply changes the map scroll direction. In this example, the user first scrolls the map image in the upper right direction indicated by a first scroll path 71a and then changes to the upper left direction indicated by a second scroll path 71b, i.e., changes the direction by 270 degrees. Thus, as shown in FIG. 4, the first scroll path 71a is angled upwardly by 45 degrees relative to the horizontal line H1 and the second scroll path 71b is angled upwardly by 135 degrees relative to the horizontal line H2. In other words, the angle (total direction difference) between the first scroll path 71a and the second scroll path 71b is 90 degrees.

In making the transition in this situation from the first scroll path 71a to the second scroll path 71b, the scroll direction bias is used to make the lines at the transition area to be smooth curves. In this example, the first and second scroll paths at the crossing area is divided into segments S1-S5 each being added with a predetermined value of the scroll direction bias, for example, 18 degrees. Thus, the scroll direction of the segment S1 is 63 degrees (i.e., 45+18), the scroll direction of the segment S2 is 81 degrees (i.e., 63+18), the scroll direction of the segment S3 is 99 degrees (i.e., 81+18), the scroll direction of the segment S4 is 117 degrees (i.e., 99+18), and the scroll direction of the segment S5 is 135 degrees (i.e., 117+18)

By applying this procedure to all the segments S1-S5, the final angle of 135 degrees of the second scroll path 71b is reached as noted above. The value of scroll direction bias is not limited to 18 degrees and various other values can be used depending on the desired operation speed and calculation power of the navigation system. Supposing that the scroll direction bias is 10 degrees, for smoothing the transition angle of the scroll direction, the map scroll method adds 10 degrees for each movement of the cursor 23 until the direction angle matches with the angle of the second scroll path 71b.

In addition to the scroll direction bias, the present invention further incorporates a notion of total direction difference for smoothing the changes of the map scroll direction. The total direction difference is an amount of angle to be deviated between the previous scroll direction and the current scroll direction. In the example in FIG. 4, the total direction difference in the beginning where the scroll direction bias is applied is 90 degrees (i.e., 135−45=90). As the scroll direction bias is applied, the amount of the scroll direction bias is deducted incrementally from the total direction difference at each movement of the cursor.

Thus, in the example of FIG. 4, when the scroll direction bias of 18 degrees is applied to the first segment S1 as shown in the example in FIG. 4, the total direction difference becomes 72 degrees (i.e., 90−18). Likewise, when the scroll direction bias of 18 degrees is applied to the second segment S2, the total direction difference becomes 54 degrees (i.e., 77−18). The procedure described above is repeated until the total direction difference becomes zero.

Preferably, in determining a value of the scroll direction bias, the following equation is applied:

$$SDB = TDD/(\text{desired lag time} * \text{update frequency})$$

where SDB is a value of the scroll direction bias and TDD is a total direction difference, and TDD is determined when the user changes direction of the scrolling as an angle between the previous scroll direction and the current scroll direction. The lag time is a time needed for completing the direction change of the map scroll operation which can be arbitrarily set, such as one (1) second. The update frequency is a number of times (steps) that the scroll direction is updated or modified per second by adding the scroll direction bias. For example, if the update frequency is set to 5, the scroll direction is updated five times per second. The update frequency may be a fixed preset value or may be a variable value that takes various performance factor of a navigation system into consideration.

Under the map scroll method of the present invention, the scroll direction at the cursor positions can be updated using the scroll direction bias (SDB) as follows:

$$X\text{current} = X\text{current} + (\text{Scroll Speed}) * \text{Sin}(\theta)$$

$$Y\text{current} = Y\text{current} + (\text{Scroll Speed}) * \text{Cos}(\theta)$$

where θ is a scroll angle after applying the scroll direction bias SDB, that is, θ=θ+SDB.

Figure 5A:
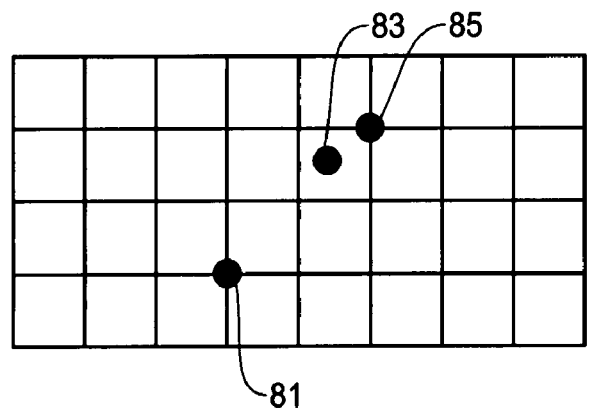
FIGS. 5A and 5B are schematic diagrams showing an example of situation where inaccuracy in the map scroll position results from the limitation of pixel resolution and an example of way for correcting such inaccuracy.
Figure 5B:
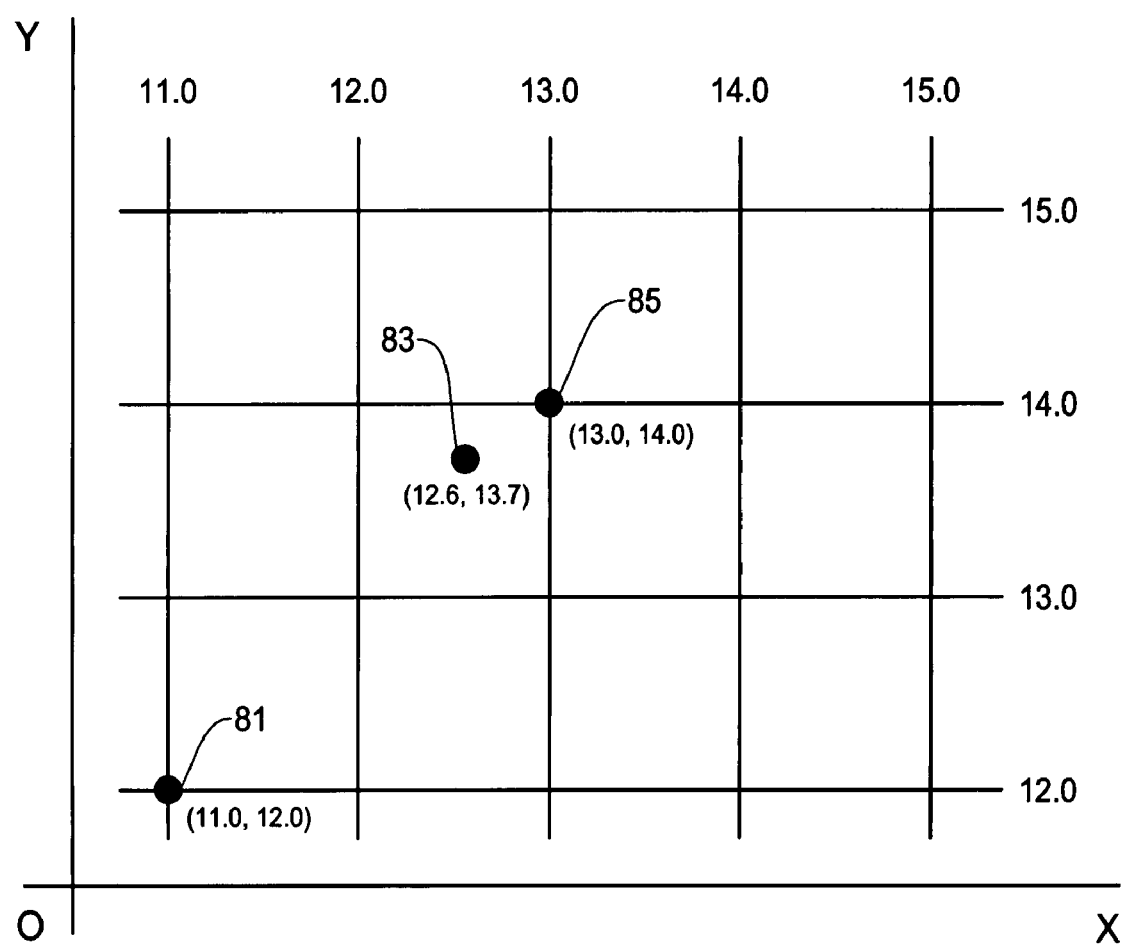

As is known in the art, the accuracy in scrolling the map image is partly limited by pixel resolution of the monitor screen of the navigation system. Thus, the map scroll method under the present invention for smoothly scrolling the map image incorporates a method for correcting the errors associated with the pixel resolution. The schematic view of FIGS. 5A and 5B show a situation where there is a difference between the actual pixel position and the calculated position on the monitor screen. In the example of FIGS. 5A and 5B, with reference to an initial point 81, the new point is calculated by the navigation system which is indicated by a calculated point 83 for the display screen.

However, an actual pixel point (approximate point) 85 is used instead of the calculated point 83 on the display screen since the calculated position 83 does not accurately match with an actual pixel location. The difference between the calculated position and the actual pixel position can be stored and re-applied for the later occasions. Supposing that X and Y coordinate of the calculated position 83 is 12.6 and 13.7, respectively, and that an actual pixel position is 13.0 and 14.0 due to the pixel resolution of the display, there are the differences of 0.4 and 0.3 in the X and Y positions between the actual pixel position 85 and the calculated location 83. The new locations are assigned by:

$$Xnew=f(Xcurrent)+Xerr$$

$$Ynew=f(Ycurrent)+Yerr$$

where Xnew and Ynew represent new positions.

Then, the current position and the error are updated as follows:

$$Xcurrent=approx(Xnew)$$

$$Ycurrent=approx(Ynew)$$

$$Xerr=Xnew-Ycurrent$$

$$Yerr=Ynew-Ycurrent$$

Thus, the calculated position 83 is corrected to match the actual pixel position 85 on the display screen.

Figure 6:
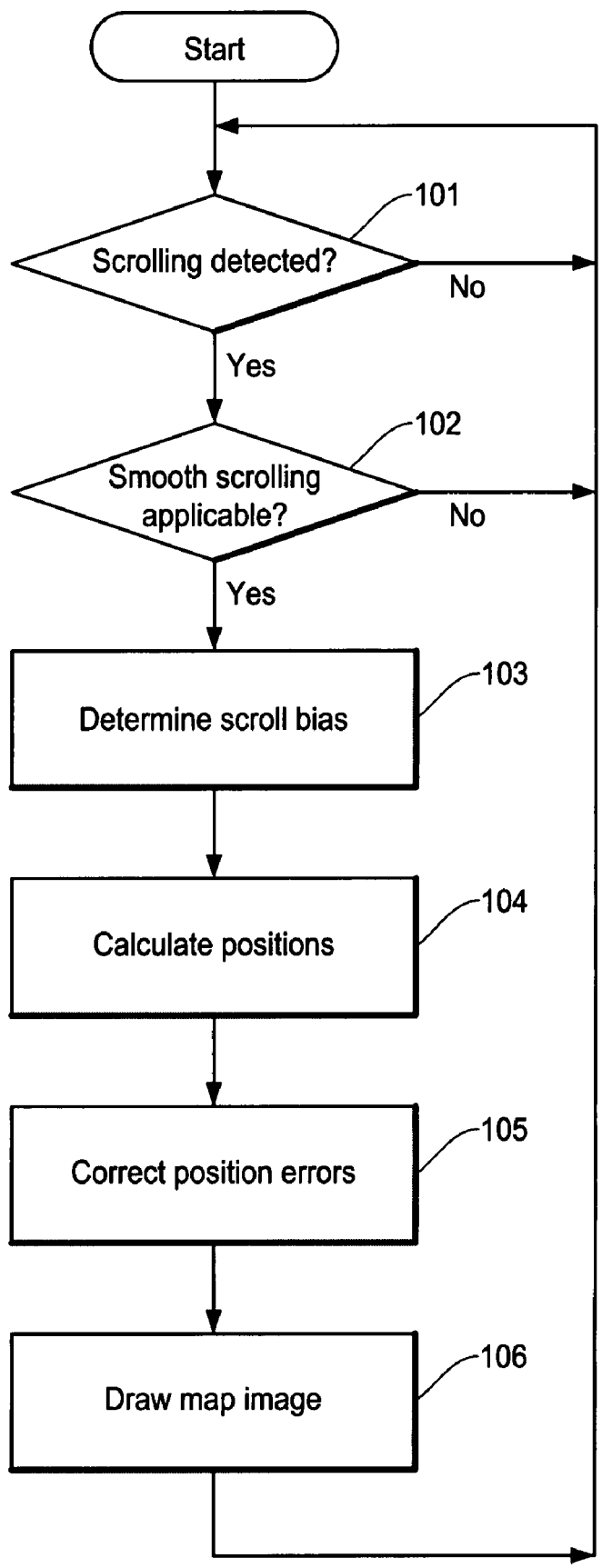
FIG. 6 is a flow chart showing an example of basic operational steps involved in the smooth map scrolling method under the present invention.

FIG. 6 is a flow chart showing an example of basic operational steps involved in the smooth map scrolling method under the present invention. As the procedure starts, in the first step 101, the navigation system will determine whether the user has activated the map scroll key or otherwise started the map scroll operation. The user may attempt to scroll the map image by pressing scroll keys or other equivalent thereto of the navigation system for moving the cursor 23 on the screen.

When the navigation system detects that the user has activated the map scroll operation, the navigation system will determine if the scroll smoothing method of the present invention is applicable in the step 102. In this step, the process determines whether the map scroll condition is suitable for applying the smoothing method of the present invention. In the case where, for example, the scroll direction change (angle between the paths 61a and 61b in FIGS. 3B and 3C) is 180 degrees, which indicates a reverse movement, the navigation may not apply the smooth scrolling method. Further, if the scroll direction change is not so sharp, for example from the direction M to the direction N in FIG. 3A, the navigation may not apply the scroll smoothing method.

The navigation system may set the range of scroll direction change, for instance a range of angle between the paths 61a and 61b in FIGS. 3B and 3C, i.e., a total direction difference (TDD) from 45 to 90 degrees, as a condition to apply the smooth scroll processing. In this case, the scroll smoothing method is applied only when the direction change is within the range from 45 to 90 degrees. Such a range of the direction change to apply the smooth scrolling method is not limited to 45 to 90 degrees but may take any other range.

Other condition to apply the map scroll smoothing method may include availability of resources of the navigation system such as a computing power. In the case where the performance of the navigation system may be adversely affected by applying the map scroll smoothing method, the navigation system may decide not to apply the smooth map scroll method. Further, if the navigation system detects that the user is approaching the next intersection that requiring a maneuvering action (ex. make a turn), the navigation system may decide not to apply the smooth map scrolling method because the scrolling method may adversely affect the route guidance operation or safe driving.

If it is determined that the scroll smoothing process is applicable in the step 102, a value of the scroll direction bias (SDB) will be determined in the step 103. As noted above, the scroll direction bias is an angle to be added in a step by step manner to a previously specified scroll direction when the angle of scroll direction change is within the predetermined range. Also noted above, the scroll direction bias is determined by:

$$SDB=TDD/(desired\ lag\ time*update\ frequency)$$

In the case where the desired lag time is one (1) second, and the update frequency is 5, and the total direction difference (TDD) is 90 degrees, the SDB is obtained by 90/(1*5), which results in the SDB value of 18 degrees. The values of the desired lag time and update frequency are not limited to the above example but can be other values to accommodate the particular needs and conditions of the navigation system. For example, the desired lag time may be 0.5 second and the update frequency may be 10 which may be smoother in changing the scroll direction than the above example.

Those values may be selected dynamically based on the computer resources available. For example, the navigation system may reduce the value of the update frequency (number of steps for adding the scroll direction bias) if it determines that the computer is too busy to perform other functions. For example, the update frequency may be increased when the angle of direction change is large (not very sharp) and be decreased when the angle of direction change is small (sharp).

As the scroll direction bias is determined, the navigation system will calculate the positions on the display screen in the step 104. The error correction as described above with reference to FIGS. 5A and 5B is applied to modify the calculated position to the actual pixel position on the monitor screen in the step 105. Finally, the map image at the corrected pixel locations will be illustrated on the monitor screen in the step 106. The above procedure will be repeated as necessary for each update frequency. The resultant scroll path will become smoother, thereby achieving a more comfortable and accurate map scroll operation.

Figure 7:
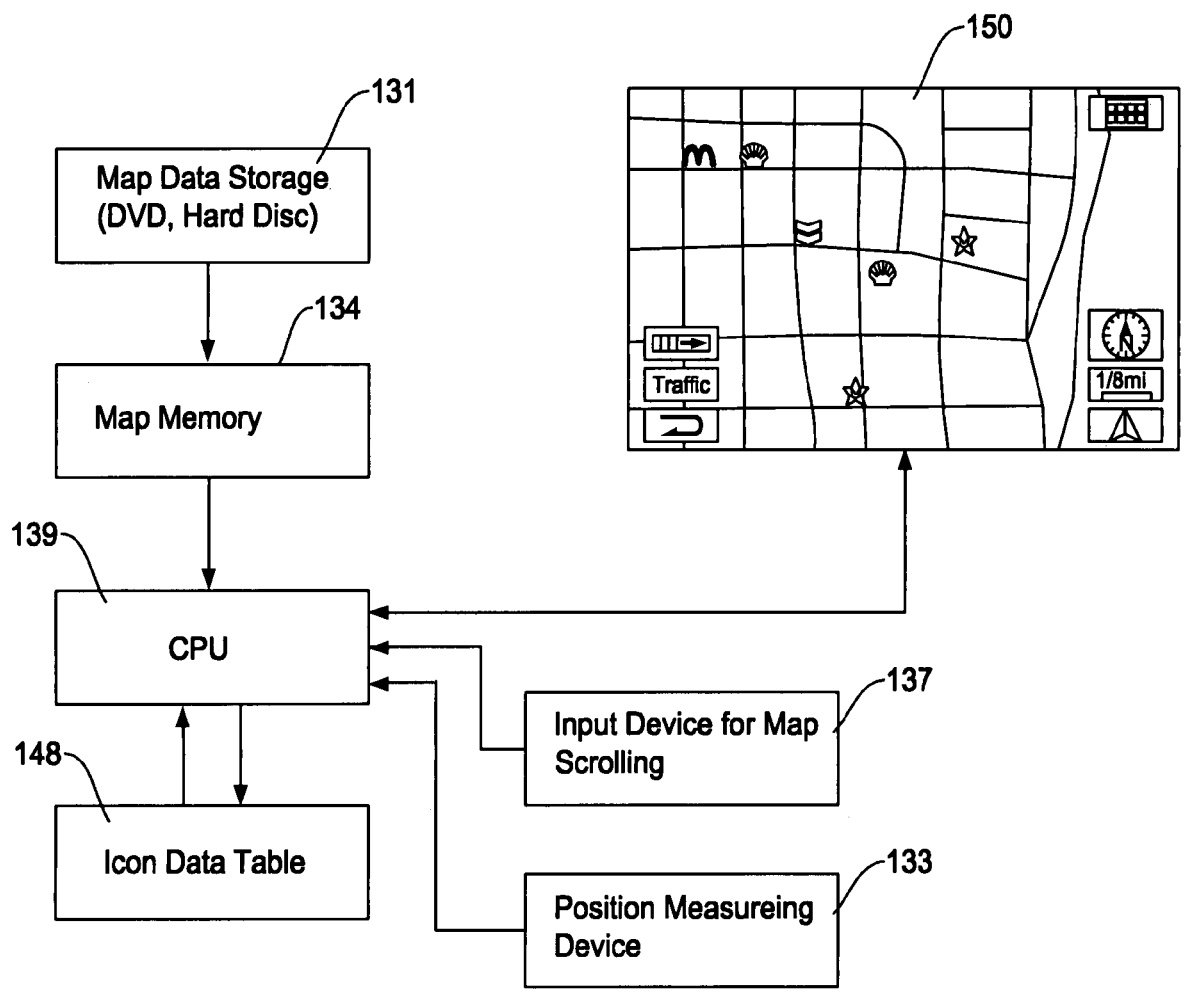
FIG. 7 is a functional block diagram showing an example of basic structure of the display apparatus of the present invention for achieving the smooth map scroll operation for the navigation system.

FIG. 7 is a functional block diagram showing an example of basic structure of the map scroll apparatus of the present invention for achieving the smooth map scroll operation for the navigation system. The structure of FIG. 7 is applicable to any electronic device having a navigation function which enables the electronic device to guide the user to a particular location as noted above. The map scroll apparatus of the present invention includes a monitor 150 for interfacing with the user, and a map scroll controller (CPU) 139 for controlling an overall operation of the apparatus of the present invention.

The block diagram of FIG. 7 further includes a map data storage 131 such as a DVD or a hard disc for storing map data, a map memory 134 for storing a required portion of the map data retrieved from the map data storage 131, an input device 137 for the user to activate the map scroll operation such as a keypad or a remote controller, a position measuring device 133 for detecting a current position of the user, and a buffer memory 148 for storing data such as a scroll direction bias for processing the map scroll operation.

In FIG. 7, the map scroll apparatus of the present invention is able to retrieve the map data from the map data storage 131 and map memory 134. Based on the retrieved map data, the map scrolling apparatus displays the map image on the monitor 150 which may be scrolled by the user through the operation of the input device 137. If the electronic device implementing the present invention has a communication capability either through wire or wireless, such map data can be retrieved from a remote data server. The CPU 139 controls an overall operation of map scrolling by detecting an angle of map scroll direction, determining a number of update frequency, adding the scroll direction bias at each update frequency, etc.

For scrolling the map image, the user operates the input device 137 to change the map image from the current location to another location. Typically, such an input device has a limited number of scroll directions such as eight directions as indicated by FIG. 3A. As soon as the input device is activated, the CPU 139 checks whether the smooth scrolling of the present invention is applicable. The CPU 139 may make this judgement based on the range of scroll direction change, for example, a range of angle from 45 degrees to 90 degrees, as a condition to apply the smooth scroll processing.

As noted above, other condition to apply the map scroll smoothing method may include availability of resources of the navigation system such as a computing power. In the case where the performance of the navigation system may be adversely affected by applying the map scroll smoothing method, the CPU 139 may decide not to apply the smooth map scroll method. Further, if the position measuring device 133 indicates that the user is approaching the next intersection that requiring a maneuvering action (make a turn), the CPU 139 may decide not to apply the smooth map scrolling method because it may adversely affect the route guidance operation or safe driving.

If it is determined that the scroll smoothing process is applicable, the CPU 139 determines a value of the scroll direction bias (SDB) and the update frequency which is the number of steps for adding the scroll direction bias. For example, the update frequency may be increased when the angle of direction change is large and be decreased when the angle of direction change is small. The CPU 139 subtracts the scroll direction bias from the total direction difference at each step of update.

The CPU 139 determines whether the map scrolling operation by the user is completed, i.e., stopped for a time longer than the predetermined time. If the map scrolling operation is completed, the CPU 139 controls the map scroll apparatus to display the map image at the final location specified by the user. Consequently, the sharp change in the map scroll direction made by the user will be mitigated to the map scroll operation that changes the scrolling direction with a gentle curve.

FIG. 8 shows an embodiment of the structure of a vehicle navigation system for implementing the map scroll method present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the functional blocks identical to that of FIG. 7 are denoted by the same reference numerals. The navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 8 further includes a map information memory 134 for storing the map information which is read from the data storage medium 131, a database memory 135 for storing database information such as point of interest (POI) information which is read out from the data storage medium 131, a remote controller 137 for executing a menu selection operation, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 8, the navigation system further includes a bus 136 for interfacing the above units in the system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporarily storing data for ease of data processing, and a monitor (display) 150.

The CPU 139 controls an overall operation of map scrolling by detecting an angle of map scroll direction, determining a number of update frequency, adding the scroll direction bias at each update frequency, etc. The data related to the smooth map scroll operation such as the scroll direction bias, etc. will be stored in the buffer memory 148 for further processing. As noted above, the scroll direction bias is added at each update frequency so that the map scroll direction is ideally curved when there is a sharp change in the map scroll direction.

A program that performs the procedure described in the flow chart of FIG. 6 is stored in the ROM 140, the data storage device 131, or other storage medium and is executed by the CPU 139. The buffer memory 148 may be used for temporarily storing the data for processing the operation for smoothing the sharp change of the scroll direction. Thus, even if the user changes the map scroll direction such as 45 degrees, the navigation system modifies such abrupt changes so that the scroll direction changes more gently, which is reflected on the monitor 150.

As has been described above, according to the present invention, when the user operates scroll keys, the navigation system scrolls a map image on the monitor screen with a modified angle when the user sharply changes the scroll direction. Such a scroll smoothing operation is applied to a situation where such a change of scroll direction is within a predetermined angle range by adding a scroll direction bias for each update frequency. The navigation system dynamically adjusts the scroll direction bias and the update frequency depending on the degree of direction change and the available system resources such as processing speed in the navigation system. Therefore, the navigation system is able to keep displaying the smooth operation of the map scroll on the monitor screen even when the user sharply changes the scrolling direction so that the user is able to recognize the images actually illustrated on the screen and to reach the intended location of the map image quickly and accurately.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A map scroll method for a navigation system, comprising the following steps of:
   receiving a scroll signal from an input device operated by a user for scrolling a map image on a monitor screen of the navigation system;
   checking a current condition for applying a smooth scroll operation; and
   conducting the smooth scroll operation in response to the scroll signal while adjusting a scroll angle of the map image on the monitor screen based on the current condition;
   wherein the current condition includes an angle of scroll direction change where the smooth scroll operation is conducted when the angle of scroll direction change is within a predetermined range; and
   wherein said step of conducting the smooth scroll operation further includes the following steps of:
      determining an amount of scroll direction bias which is an angle to be added in a step by step manner to a previously specified scroll direction when the angle of scroll direction change is within the predetermined range;
      determining an amount of update frequency which is a number of times that the scroll direction is updated or modified by adding the scroll direction bias; and
      adding the amount of the scroll direction bias to the previously specified scroll direction by the number of times defined by the update frequency.

2. A map scroll method for a navigation system as defined in claim 1, wherein said step of checking the current condition includes a step of checking a computing power of the navigation system currently available for the scroll operation.

3. A map scroll method for a navigation system as defined in claim 1, wherein said step of conducting the smooth scroll operation further includes a step of determining an amount of time needed for completing the direction change of the scroll operation.

4. A map scroll method for a navigation system as defined in claim 1, wherein said step of checking the current condition includes a step of determining an amount of total direction difference which is an amount of angle between a previously specified scroll direction and a currently specified scroll direction.

5. A map scroll method for a navigation system as defined in claim 4, wherein said step of determining the amount of scroll direction bias is conducted by dividing the total direction difference by the update frequency.

6. A map scroll method for a navigation system as defined in claim 1, wherein said step of checking the current condition includes a step of checking a location of the user as to whether the user is approaching a next intersection that requiring a maneuvering action so as not to adversely affect a route guidance operation of the navigation system and safe driving.

7. A map scroll method for a navigation system as defined in claim 1, further includes a step of correcting an error associated with calculated positions of the map image relative to actual pixel positions on the monitor screen.

8. A map scroll apparatus for a navigation system, comprising:
   means for receiving a scroll signal from an input device operated by a user for scrolling a map image on a monitor screen of the navigation system;
   means for checking a current condition for applying a smooth scroll operation; and
   means for conducting the smooth scroll operation in response to the scroll signal while adjusting a scroll angle of the map image on the monitor screen based on the current condition;
   wherein the current condition includes an angle of scroll direction change where the smooth scroll operation is conducted when the angle of scroll direction change is within a predetermined range; and
   wherein said means of conducting the smooth scroll operation further includes:
      means for determining an amount of scroll direction bias which is an angle to be added in a step by step manner to a previously specified scroll direction when the angle of scroll direction change is within the predetermined range;
      means for determining an amount of update frequency which is a number of times that the scroll direction is updated or modified by adding the scroll direction bias; and
      means for adding the amount of the scroll direction bias to the previously specified scroll direction by the number of times defined by the update frequency.

9. A map scroll apparatus for a navigation system as defined in claim 8, wherein said means for checking the current condition includes means for checking a computing power of the navigation system currently available for the scroll operation.

10. A map scroll apparatus for a navigation system as defined in claim 8, wherein said means for conducting the smooth scroll operation further includes means for determining an amount of time needed for completing the direction change of the scroll operation.

11. A map scroll apparatus for a navigation system as defined in claim 8, wherein said means for checking the current condition includes means for determining an amount of total direction difference which is an amount of angle between a previously specified scroll direction and a currently specified scroll direction.

12. A map scroll apparatus for a navigation system as defined in claim 11, wherein said means for determining the amount of scroll direction bias is conducted by dividing the total direction difference by the update frequency.

13. A map scroll apparatus for a navigation system as defined in claim 8, wherein said means for checking the current condition includes means for checking a location of the user as to whether the user is approaching a next intersection that requiring a maneuvering action so as not to adversely affect a route guidance operation of the navigation system and safe driving.

14. A map scroll apparatus for a navigation system as defined in claim 8, further includes means for correcting an error associated with calculated positions of the map image relative to actual pixel positions on the monitor screen.

* * * * *